(12) United States Patent
Liu

(10) Patent No.: US 7,562,417 B2
(45) Date of Patent: Jul. 21, 2009

(54) HINGE MODULE

(75) Inventor: Chih-Kuan Liu, Taipei (TW)

(73) Assignee: Quanta Computer Inc., Tao Yuan Shien (TW)

( * ) Notice: Subject to any disclaimer, the term of this patent is extended or adjusted under 35 U.S.C. 154(b) by 0 days.

(21) Appl. No.: 11/727,716

(22) Filed: Mar. 28, 2007

(65) Prior Publication Data

US 2008/0172831 A1    Jul. 24, 2008

(30) Foreign Application Priority Data

Jan. 19, 2007    (TW)    ............................... 96201181 U

(51) Int. Cl.
   *E05D 3/10*    (2006.01)
(52) U.S. Cl. ......................................... 16/367; 16/250
(58) Field of Classification Search .................. 16/366, 16/367, 371, 327, 250; 49/463, 464, 465
   See application file for complete search history.

(56) References Cited

U.S. PATENT DOCUMENTS

| | | | |
|---|---|---|---|
| 6,256,837 B1 * | 7/2001 | Lan et al. ....................... | 16/334 |
| 6,424,779 B1 * | 7/2002 | Ellison et al. ................ | 385/134 |
| 6,643,133 B1 * | 11/2003 | Liu ............................ | 361/704 |
| 6,798,646 B2 * | 9/2004 | Hsu ............................ | 361/681 |
| 6,958,902 B2 * | 10/2005 | Tseng et al. ................. | 361/681 |
| 7,027,297 B1 * | 4/2006 | Mizuno et al. .............. | 361/683 |
| 7,123,472 B2 * | 10/2006 | Huang et al. ................. | 361/681 |
| 7,159,279 B2 * | 1/2007 | Liu et al. ....................... | 16/367 |
| 7,189,023 B2 * | 3/2007 | Kang et al. .................. | 403/119 |
| 7,191,492 B2 * | 3/2007 | Yang ........................... | 16/374 |
| 7,346,960 B2 * | 3/2008 | Higano et al. .................. | 16/367 |
| 7,356,881 B2 * | 4/2008 | Park et al. ...................... | 16/367 |
| 2003/0010787 A1 * | 1/2003 | Dalton et al. ................ | 220/912 |
| 2003/0167600 A1 * | 9/2003 | Chien et al. .................... | 16/367 |
| 2003/0167601 A1 * | 9/2003 | Chen .......................... | 16/367 |
| 2005/0207104 A1 * | 9/2005 | Love ........................... | 361/683 |

* cited by examiner

*Primary Examiner*—Victor Batson
*Assistant Examiner*—Matthew Sullivan
(74) *Attorney, Agent, or Firm*—Rabin & Berdo, PC

(57) ABSTRACT

A hinge module is described. A T-shaped frame is pivotally connected with a base portion at one end such that the T-shaped frame rotates around a first axis relative to the base portion. A pair of connection members are pivotally connected with the other two opposite ends of the T-shaped frame such that the pair of connection members rotates around a second axis relative to the T-shaped frame, wherein the second axis is perpendicular to the first axis, and led through a cavity of the T-shaped frame. A U-shaped casing is manual-detachably connected with the T-shaped frame to fully cover a cavity of the T-shaped frame.

4 Claims, 2 Drawing Sheets

HINGE MODULE

RELATED APPLICATIONS

This application claims priority to Taiwan Application Serial Number 96201181, filed Jan. 19, 2007, which is herein incorporated by reference.

BACKGROUND

1. Field of Invention

The present invention relates to a hinge module. More particularly, the present invention relates to a hinge module of a notebook computer.

2. Description of Related Art

Tablet PC (a new type of notebook computer) is a popular notebook computer on the market. Like conventional notebook computers, some tablet PC consists of a main body portion (with a keyboard) and a display portion (with an LCD panel). The display portion is pivotally connected with the main body portion by a hinge. The hinge of the tablet PC provides more rotation axis and more functions than a conventional notebook computer does, such that the display portion of the tablet PC can be easily swiveled to a desired position.

Because the hinge of the tablet PC provides more rotation axis and functions, its design is more complicated than a conventional one installed a notebook computer. Thus, more efforts are needed for improving hinge design of the tablet PC.

SUMMARY

A hinge module comprises the following components. A T-shaped frame is pivotally connected with a base portion at one end such that the T-shaped frame rotates around a first axis relative to the base portion, wherein the T-shaped frame has a cavity. A pair of connection members are pivotally connected with the other two opposite ends of the T-shaped frame such that the pair of connection members rotates around a second axis relative to the T-shaped frame, wherein the second axis is perpendicular to the first axis, and led through the cavity of the T-shaped frame. A U-shaped casing is manual-detachably connected with the T-shaped frame to fully cover the cavity.

It is to be understood that both the foregoing general description and the following detailed description are by examples, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DESCRIPTION OF THE EMBODIMENTS

Figure 1:
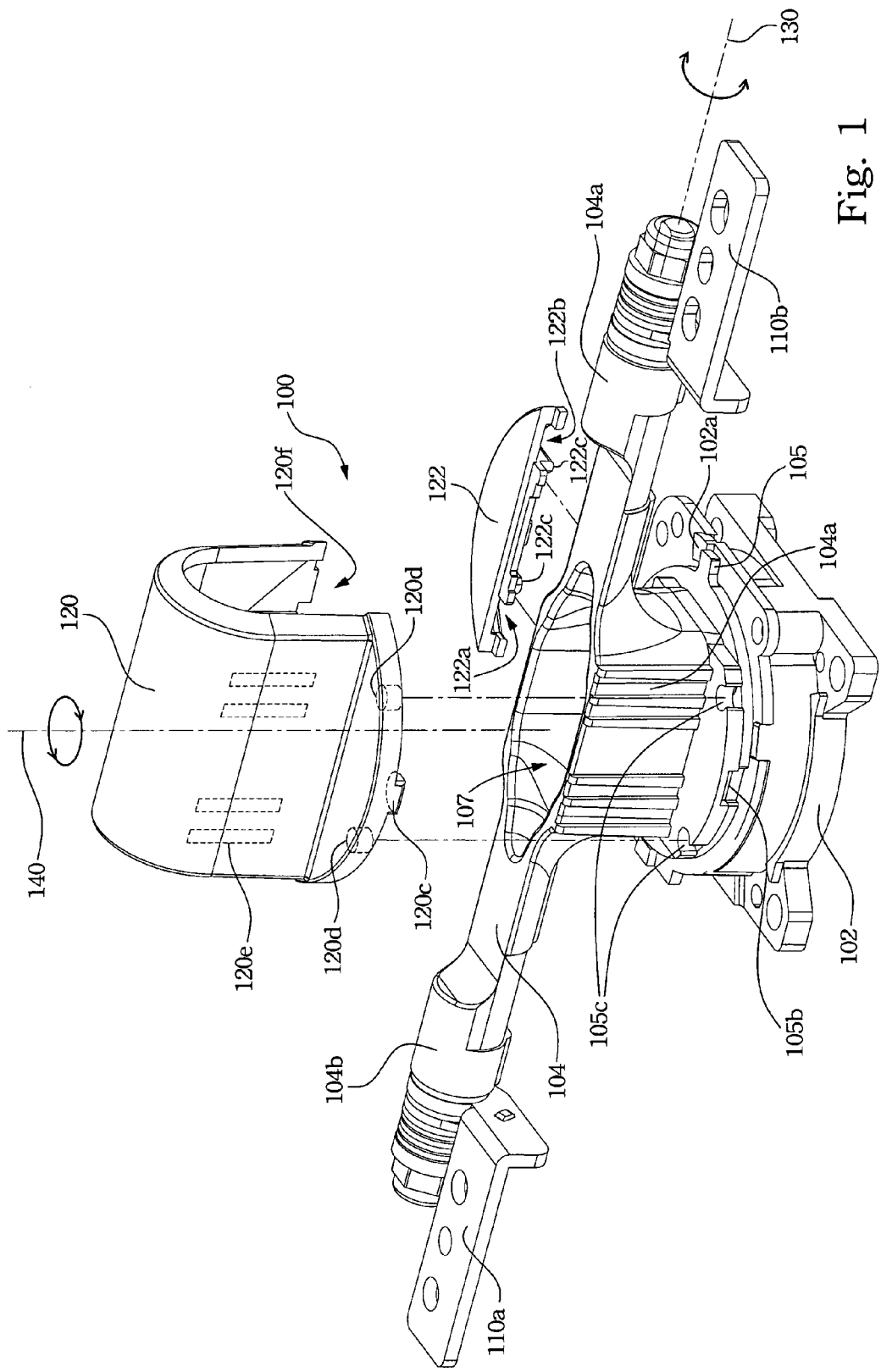
FIG. 1 and FIG. 2 illustrate two different views of a hinge module according to one embodiment of this invention.

Reference will now be made in detail to the present preferred embodiments of the invention, examples of which are illustrated in the accompanying drawings. Wherever possible, the same reference numbers are used in the drawings and the description to refer to the same or like parts.

Figure 2:
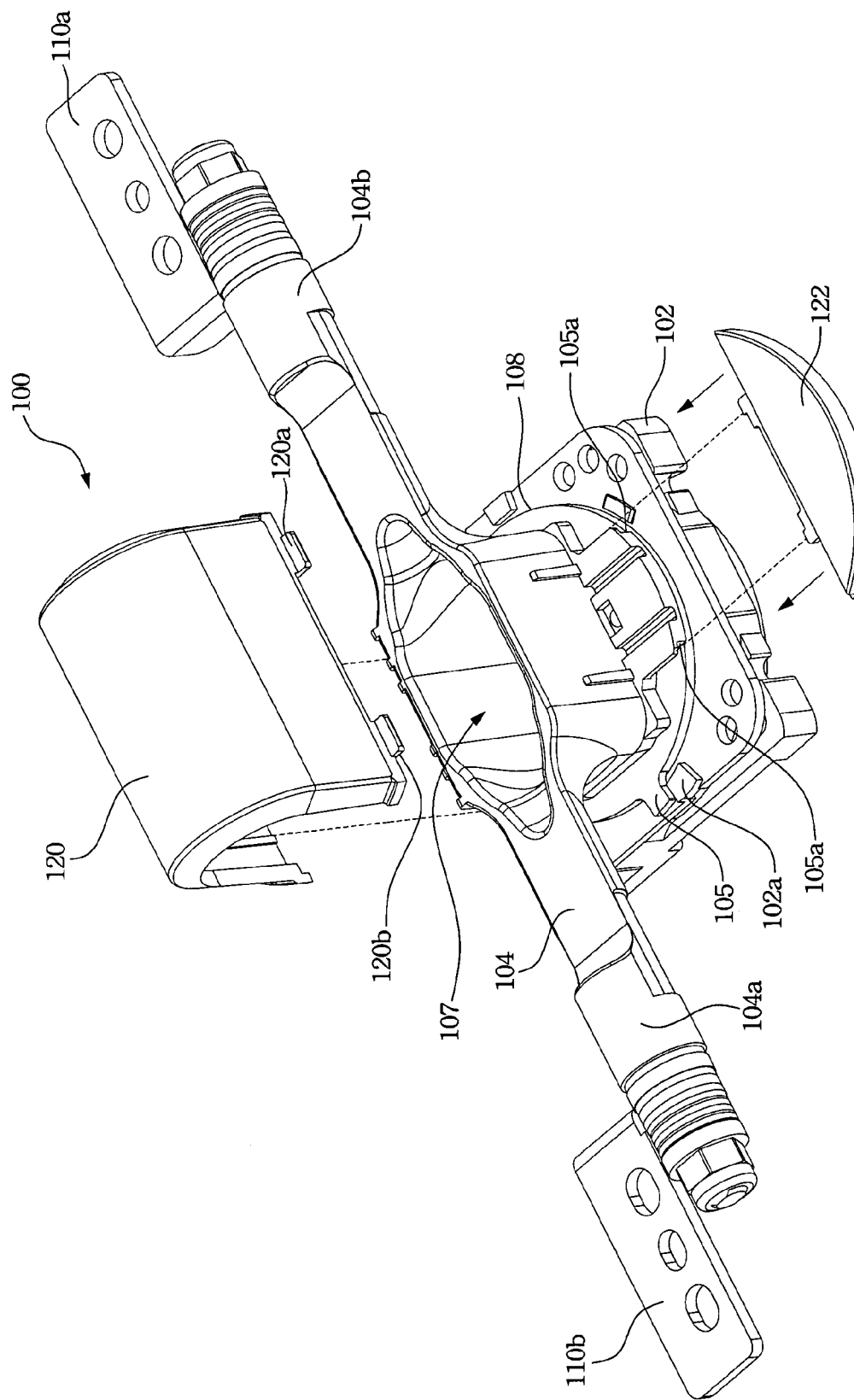

FIG. 1 and FIG. 2 illustrate two different views of a hinge module according to one embodiment of this invention. The hinge module 100 is to pivotally interconnect a main body portion (with a keyboard) and a display portion (with an LCD panel) of a notebook computer. The hinge module 100 mainly consists of a base portion 102 and a T-shaped portion 104. The base portion 102 is secured to the main body portion (with a keyboard) of the notebook computer. One end of the T-shaped portion 104, which has three ends, is pivotally connected with the base portion 102 such that the T-shaped frame 104 rotates around an axis 140 relative to the base portion 102. A pair of connection members 110a and 110b are pivotally connected with the other two opposite ends 104b and 104a of the T-shaped frame 104 such that the connection members 110a and 110b rotate around an axis 130 relative to the T-shaped frame 104. The axis 140 is perpendicular to the axis 130, and led through a cavity 107 of the T-shaped frame 104. The connection members 110a and 110b are secured to the display portion (with an LCD panel) of the notebook computer. Therefore, the display portion is rotatable around the axis 130 and the axis 140 relative to the main body portion.

The base portion 102 has a block member 102a to stop a rotation restrictor 105 of the T-shaped frame 104 such that the T-shaped frame 104 rotates with a limited range.

The T-shaped frame 104 has a cavity 107, by which the base portion 102 is pivotally connected with the T-shaped frame 104. The cavity 107 also serves as a channel, through which signal or power cables are led, to electrically interconnect the main body portion and the display portion of the notebook computer.

A U-shaped casing 120 is manual-detachably connected with the T-shaped frame 104 to fully cover the cavity 107 so as to shield dusts and water. As illustrated in FIG. 1, a concave portion 120f of the U-shaped casing 120 houses part of the T-shaped frame 104 and fully covers the cavity 107. The U-shaped casing 120 has sliding rails 120e on its inner surface (within the concave portion 120f) to slide on tracks 104a of the T-shaped frame 104 when the U-shaped casing 120 is assembled to the T-shaped frame 104 downwards. The U-shaped casing further has position pins 120d on the bottom surface to engage with position holes 105c of the T-shaped frame 104. A hook 120c of the U-shaped casing also engages with a notch 105b of the T-shaped frame 104. Therefore, one side of the U-shaped casing 120 is secured to one side of the T-shaped frame 104.

In order to further secure the U-shaped casing 120, a sector casing 122 is to secure an opposite side of the U-shaped casing 120 to an opposite side of the T-shaped frame 104. In particular, sliding rails 122c of the sector casing 122 slides on tracks 105a of the T-shaped frame 104, and hooks 120a and 120b of the U-shaped casing 120 then engages with slots 122a and 122b of the sector casing 122. Therefore, the U-shaped casing 120 is firmly secured on the T-shaped frame 104.

According to embodiments discussed above, the hinge module of the present invention pivotally interconnects a main body portion and a display portion of a notebook computer. A U-shaped casing is also provided to shield a cavity of the hinge module from dusts and water.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A hinge module comprising:

a base portion;

a T-shaped frame, pivotally connected with the base portion at one end such that the T-shaped frame rotates around a first axis relative to the base portion, wherein the T-shaped frame has a position hole, a notch, and a cavity through which the first axis is led;

a pair of connection members, pivotally connected with the other two opposite ends of the T-shaped frame such that the pair of connection members rotates around a second axis relative to the T-shaped frame, wherein the second axis is perpendicular to the first axis;

a U-shaped casing, manual-detachably connected with the T-shaped frame to fully cover the cavity, the U-shaped casing comprising first and second opposite bottom sides, and having a position pin and a hook disposed on a bottom surface of the first bottom side of the U-shaped casing, wherein the position pin engages within the position hole of the T-shaped frame, and the hook engages within the notch of the T-shaped frame; and a sector casing slidingly connected with the T-shaped frame to secure the second bottom side of the U-shaped casing;

wherein the T-shaped frame comprises a rotation restrictor, and the base member comprises a block member to stop the rotation restrictor such that the T-shaped frame rotates with a limited range.

2. The hinge module of claim 1, wherein a concave portion of the U-shaped casing houses the T-shaped frame.

3. The hinge module of claim 1, wherein the sector casing comprises a slot, and the U-shaped casing comprises another hook at the second bottom side to engage within the slot of the sector casing.

4. The hinge module of claim 1, wherein the T-shaped frame comprises a track on an outer surface thereof, and the U-shaped casing comprises rails within the concave portion thereof to slide on tracks when the U-shaped casing is assembled to the T-shaped frame.

* * * * *